(12) United States Patent
Kato

(10) Patent No.: US 10,346,531 B2
(45) Date of Patent: Jul. 9, 2019

(54) INFORMATION PROCESSING SYSTEM, INFORMATION PROCESSING APPARATUS, CONTROL METHOD, AND STORAGE MEDIUM

(71) Applicant: CANON KABUSHIKI KAISHA, Tokyo (JP)

(72) Inventor: Yutaka Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/057,444

(22) Filed: Mar. 1, 2016

(65) Prior Publication Data

US 2016/0259772 A1 Sep. 8, 2016

(30) Foreign Application Priority Data

Mar. 2, 2015 (JP) ................................. 2015-040440

(51) Int. Cl.
*G06F 17/00* (2019.01)
*G06F 17/24* (2006.01)
*G06F 17/21* (2006.01)
*G06Q 10/10* (2012.01)

(52) U.S. Cl.
CPC .......... *G06F 17/243* (2013.01); *G06F 17/211* (2013.01); *G06Q 10/10* (2013.01)

(58) Field of Classification Search
CPC ........ G06F 17/21; G06F 17/24; G06F 17/243; G06F 17/211; G06Q 10/10
See application file for complete search history.

(56) References Cited

U.S. PATENT DOCUMENTS

| 8,370,733 | B2 * | 2/2013 | Kato | G06F 9/4446 715/212 |
| 8,522,134 | B1 * | 8/2013 | Zetlen | G06F 17/218 715/234 |
| 2002/0176101 | A1 * | 11/2002 | Tsunekawa | H04N 1/00132 358/1.6 |
| 2007/0070441 | A1 * | 3/2007 | Yumita | G06F 3/1204 358/450 |
| 2011/0289397 | A1 * | 11/2011 | Eastmond | G06F 3/0485 715/212 |
| 2012/0243032 | A1 * | 9/2012 | Hayakawa | G06K 15/1859 358/1.15 |
| 2012/0250041 | A1 * | 10/2012 | Iwasaki | G06F 3/122 358/1.9 |
| 2015/0278389 | A1 * | 10/2015 | Morishita | G06F 17/30896 715/234 |

FOREIGN PATENT DOCUMENTS

JP 2005-190432 A 7/2005

* cited by examiner

*Primary Examiner* — Stephen S Hong
*Assistant Examiner* — Marshon L Robinson
(74) *Attorney, Agent, or Firm* — Venable LLP

(57) ABSTRACT

A business form generating server generates a business form page by overlaying form information and field data. The business form generating server generates data for displaying a browsing screen on which the business form page is browsed and edited. A client apparatus adds attribute information to information for a field of the business form page based on the data, wherein the attribute information includes layout information. If the information of the field of the business form page is edited by using the browsing screen, the client apparatus determines whether or not overlaying again is necessary based on the attribute information which is added to the information of the edited field.

9 Claims, 17 Drawing Sheets

FIG. 18A

Editable business form browsing screen (1001)

Invoice (1801)

| Purchase date | Product name | Amount (YEN) |
|---|---|---|
| 2014/11/05 (1802) | XX camera | 50000 |
| (1803) | YY printer | 100000 |
| (1804) | ZZ camera | 150000 |
| 2014/11/22 (1805) | AA camera | 200000 |
| | Total: | 500000 |

FIG. 18B

Editable business form browsing screen (1001)

Invoice

| Purchase date | Product name | Amount (YEN) |
|---|---|---|
| 2014/11/05 | YY printer | 100000 |
| | ZZ camera | 150000 |
| 2014/11/22 | AA camera | 200000 |
| 2014/11/25 | XX camera | 50000 |
| | Total: | 500000 |

(1806)

INFORMATION PROCESSING SYSTEM, INFORMATION PROCESSING APPARATUS, CONTROL METHOD, AND STORAGE MEDIUM

BACKGROUND OF THE INVENTION

Field of the Invention

The present disclosure relates to an information processing system, an information processing apparatus, a control method, and a storage medium.

Description of the Related Art

An increasing number of companies have been replacing information on paper media with document data in order to improve work efficiency and to save resources by adopting paperless processes. For example, many business forms used in companies have undergone such replacement. Especially business forms output by a backbone system are output in an enormous number of pages and incur a huge amount of operation costs, so that business forms are being actively digitized. In addition, a method for generating a business form document data (a business form image) such as in PDF format by overlaying field data onto form information (flow the field data into the form to thereby apply the form), which is a template of the business form, is proposed as a generating method for a business form document.

In addition, cloud computing systems have started to become widespread as a form for managing or performing various kinds of processing on work data on a server computer side. A user accesses a web page of a cloud server computer from a browser of a client computer via the internet and browses the business form document data (a business form page) digitized on the web page. Furthermore, in accordance with a work flow, editing or printing the browsing business form document data can be considered.

Japanese Patent Laid-Open No. 2005-190432 discloses a system in which a browser of a client displays a business form image (PDF) on a confirmation screen of a business form output and, when a correction screen button is pressed, the correction screen is displayed by downloading a correction program to enable correction of data.

However, the system disclosed in Japanese Patent Laid-Open No. 2005-190432 transmits correction data to the server when the correction is performed to the business form page (PDF) that the user has browsed on the confirmation screen of the business form output. And the server needs to generate output data by overlaying corrected business form data on form data and to form an image of the output data. In other words, every time the correction is performed, the correction data is transmitted to the server and the server performs an overlay output process again using the correction data. Therefore, time for processing is required. In contrast, when the user edits the data of the business form page, it may affect layout of the business form page. For example, when the user performs correction of a character string and the capacity of the character string after the correction increases to more than the capacity of the character string before the correction, increasing a height of an area on which the character string is to be displayed and displaying the character string inside the area by executing a line feed may be considered. In this case, the overlay output process must be performed again by using the correction data.

SUMMARY OF THE INVENTION

The present disclosure provides an information processing system that enables determining appropriately whether or not to perform an overlay output process when a business form page is corrected so that editing operation can be performed easily.

According to an aspect of the present disclosure, an information processing system comprises: a business form generating unit configured to generate a business form page by overlaying form information and field data; a browsing screen generating unit configured to generate data for displaying a browsing screen on which the business form page is browsed and edited; an attribute addition unit configured to add attribute information to information of a field of the business form page based on the data, wherein the attribute information includes layout information; and a determining unit configured to determine, in a case in which the information of the field of the business form page is edited by using the browsing screen, whether or not overlaying again is necessary based on the attribute information which is added to the information of the edited field.

According to the information processing system of the present disclosure, when a business form page is corrected, whether or not to perform an overlay output process is determined appropriately so that an editing operation can be performed easily. Accordingly, when the business form page is changed, to perform the overlay output process again is suppressed and thereby a deterioration (delay) in the performance of the editing operation on a browser can be suppressed. Furthermore, when the editing of the business form page affects a layout, generating the business form page in which the setting of the form information is reflected can be performed.

Further features of the present invention will become apparent from the following description of exemplary embodiments with reference to the attached drawings.

BRIEF DESCRIPTION OF THE DRAWINGS

FIGS. 18A and 18B are diagrams illustrating an example of the business form browsing screen to which the editing operation has been performed.

DESCRIPTION OF THE EMBODIMENTS

Hereinafter, embodiments of the present invention will be described with reference to the drawings.

First Embodiment

Figure 1:
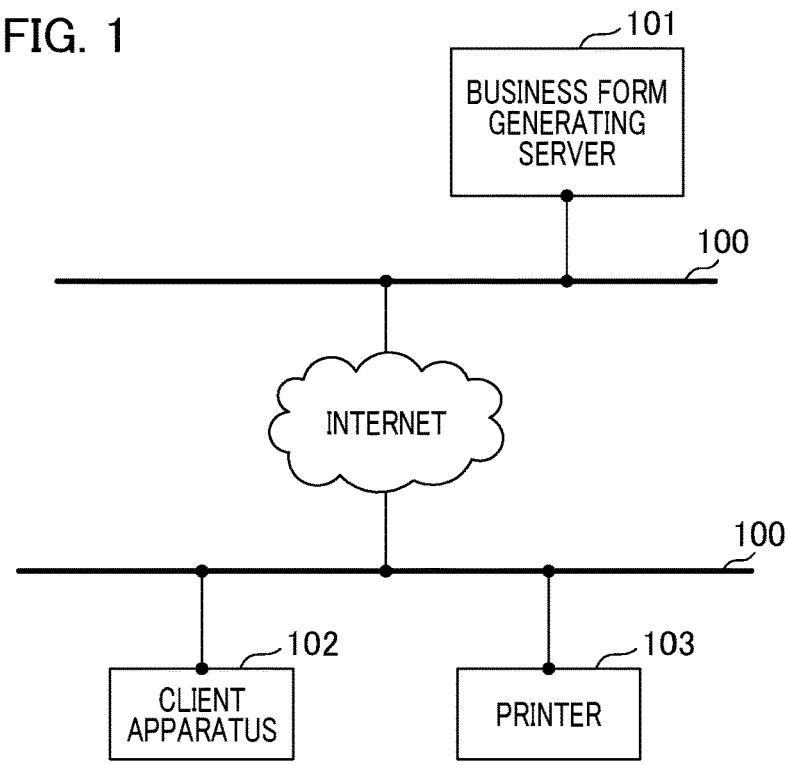
FIG. 1 is a diagram illustrating an exemplary system configuration according to an embodiment.

FIG. 1 is a diagram illustrating an exemplary system configuration according to the present embodiment.

An information processing system shown in FIG. 1 includes a business form generating server 101 and a client apparatus 102. The business form generating server 101 is an information processing apparatus of the present invention. The business form generating server 101 performs an overlay output process. In other words, the business form generating server 101 overlays field data, which is text data, and a form information file, which includes predetermined form information, and generates a business form page. The business form generating server 101 provides an instruction to a virtual printer for generating printing data corresponding to the business form page as an electronic file according to a request from the client apparatus 102.

Furthermore, the business form generating server 101 performs the generating process of business form browsing screen data. The business form browsing screen data is data for displaying a browsing screen (a business form browsing screen) to browse and edit the business form page. In the present embodiment, the business form browsing screen data at least includes overlay information, which is information related to the layout of a field figure generated at the time of the overlay output process, an editable business form page, and a business form browsing program. The business form browsing program is a program for controlling browsing and editing of the business form page. In the present embodiment, the business form browsing program is a web application that can be distributed through a network and operates on a web browser. For example, the business form browsing program is an application program (Java program) that operates by a markup language (HTML), which represents a web page, and JavaScript, which is a programming language that operates on a web browser. The business form browsing program may be an application executed on a computer system other than web applications that operate on a web browser. In addition, a configuration may be employed in which the business form generating server 101 only generates the electronic business form file of the business form page and information relating to the field figure determined at the time of overlaying, and the client apparatus 102 includes an application that can perform browsing and editing operation of the business form by using the electronic business form file. The business form generating server 101 performs an overlay output process and a generating process of the business form browsing screen data (generating browsing screen) in accordance with a request from the client apparatus 102.

A printer 103 receives a request from the client apparatus 102 and performs a process of printing the printing data on paper. The business form generating server 101, the client apparatus 102, and the printer are communicably connected to each other through a network 100. The network 100 may be, for example, the Internet, LAN, WAN, a telephone line, a dedicated digital line, ATM or a frame relay line, a cable television line, a radio line for data broadcasting, or the like. In addition, the network 100 may be realized by a combination thereof. Note that a communication unit from the client apparatus 102 to the business form generating server 101 may be different from a communication unit from the client apparatus 102 to the printer 103.

Figure 2:
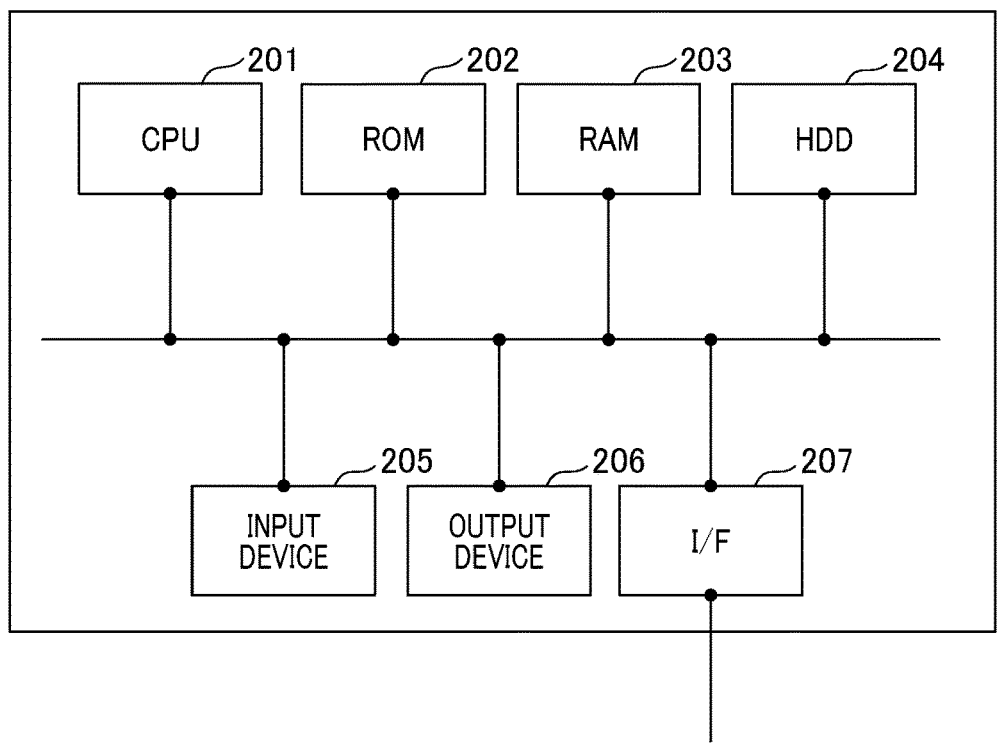
FIG. 2 is a diagram illustrating an exemplary hardware configuration of an apparatus which realizes a business form generating server or a client apparatus.

FIG. 2 is a diagram illustrating an exemplary hardware configuration of an apparatus that realizes the business form generating server or the client apparatus.

The apparatus shown in FIG. 2 includes a CPU (Central Processing Unit) 201 to I/F 207. The CPU 201 directly or indirectly controls respective devices (a ROM, a RAM, and the like to be described below), which are connected to each other by an internal bus, and executes a program to realize the present invention. A ROM (Read Only Memory) 202 stores a BIOS (Basic Input Output System).

A RAM (Random Access Memory) 203 is used as a work area of the CPU 201 or is used as a temporary storage device for loading a software module to realize the present invention. A HDD (Hard Disk Drive) 204 stores OS (Operating System), which is a basic software, or a software module. A SSD (Solid State Drive) may be used in place of the HDD 204.

An input device 205 inputs information according to an input operation of a user. For example, the input device 205 is a device such as a keyboard or a pointing device, which are not shown. An output device 206 outputs information. The output device 206 is connected to a display. The I/F 207 is an interface for connecting to the network 100. After starting the apparatus, the CPU 201 executes the BIOS and loads the OS from the HDD 204 to the RAM 203 so that the OS can be executed. The CPU 201 loads various software modules from the HDD 204 to the RAM 203 at any time so that they can be executed according to the operation of the OS. The various software modules are executed and operated by the CPU 201. In addition, the I/F 207 is controlled by the CPU 201 in accordance with the operation of the OS and realizes communication with an external apparatus.

Figure 3:
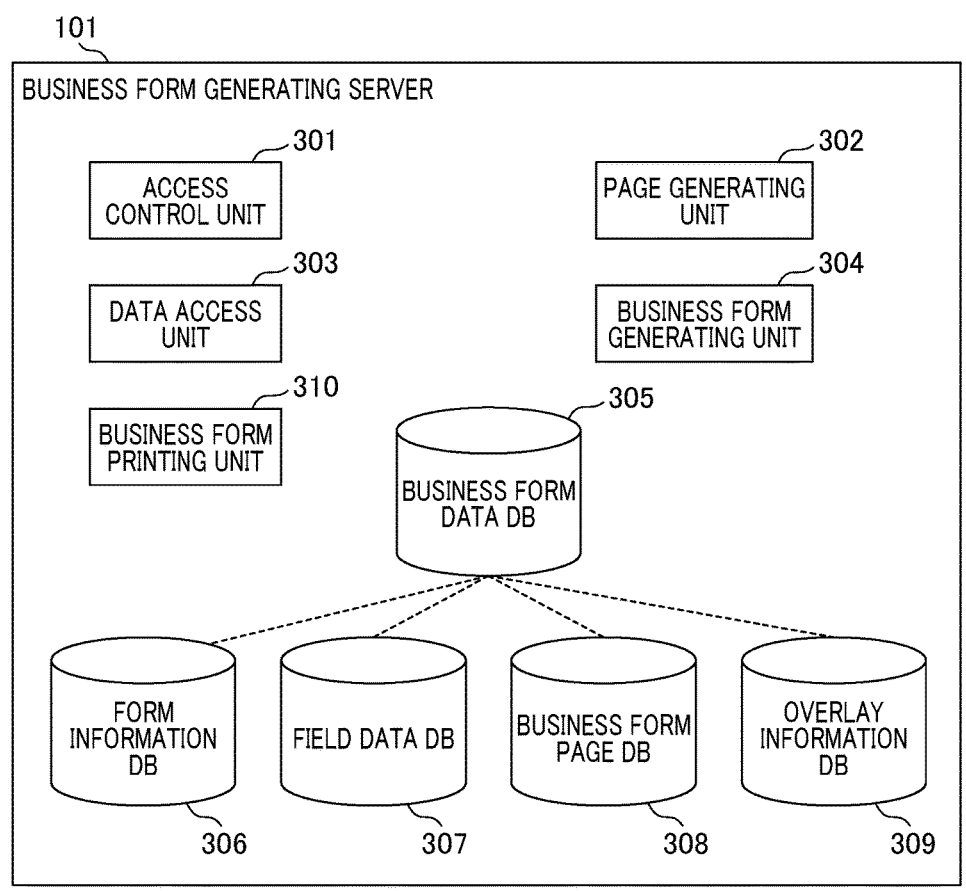
FIG. 3 is a diagram illustrating an exemplary configuration of a software module which operates on the business form generating server.

FIG. 3 is a diagram illustrating an exemplary configuration of a software module that operates on the business form generating server.

Each software modules is stored in the HDD 204 shown in FIG. 2, and is loaded to the RAM 203 and is executed by the CPU 201. The business form generating server 101 includes an access control unit 301 to an overlay information DB (database) 309. The access control unit 301 performs user authentication in accordance with a request from the client apparatus 102.

A page generating unit 302 generates a Web page to return a response to the client apparatus 102. The page generating unit 302 also generates files such as HTML, JavaScript or the like which are necessary for a web application that is the business form browsing program, and returns them to the client apparatus 102. A data access unit 303 performs access processing to each of the DBs (305 to 309).

A business form generating unit 304 reads out a form information file from a form information DB 306 via the data access unit 303. Also, the business form generating unit 304 reads out a field data file from a field data DB 307 via the data access unit 303. The business form generating unit 304 overlays form information indicated by the output form information file and the field data indicated by the output field data file, and generates a business form page. Then the business form generating unit 304 uses software such as a virtual printer and generates an electronic file of the business form page. A business form printing unit 310 receives a generating request of a printing file from the client apparatus 102 and converts format of the electronic file of the business form page to printable format.

A business form data DB (database) 305 stores business form data. The business form data indicates information for a business form name, an owner, or the like, and includes information representing which form information file and field data file generates the business form. Furthermore, the business form data includes information indicating the business form page which is a result of the overlay output process of the business form.

Figure 4:
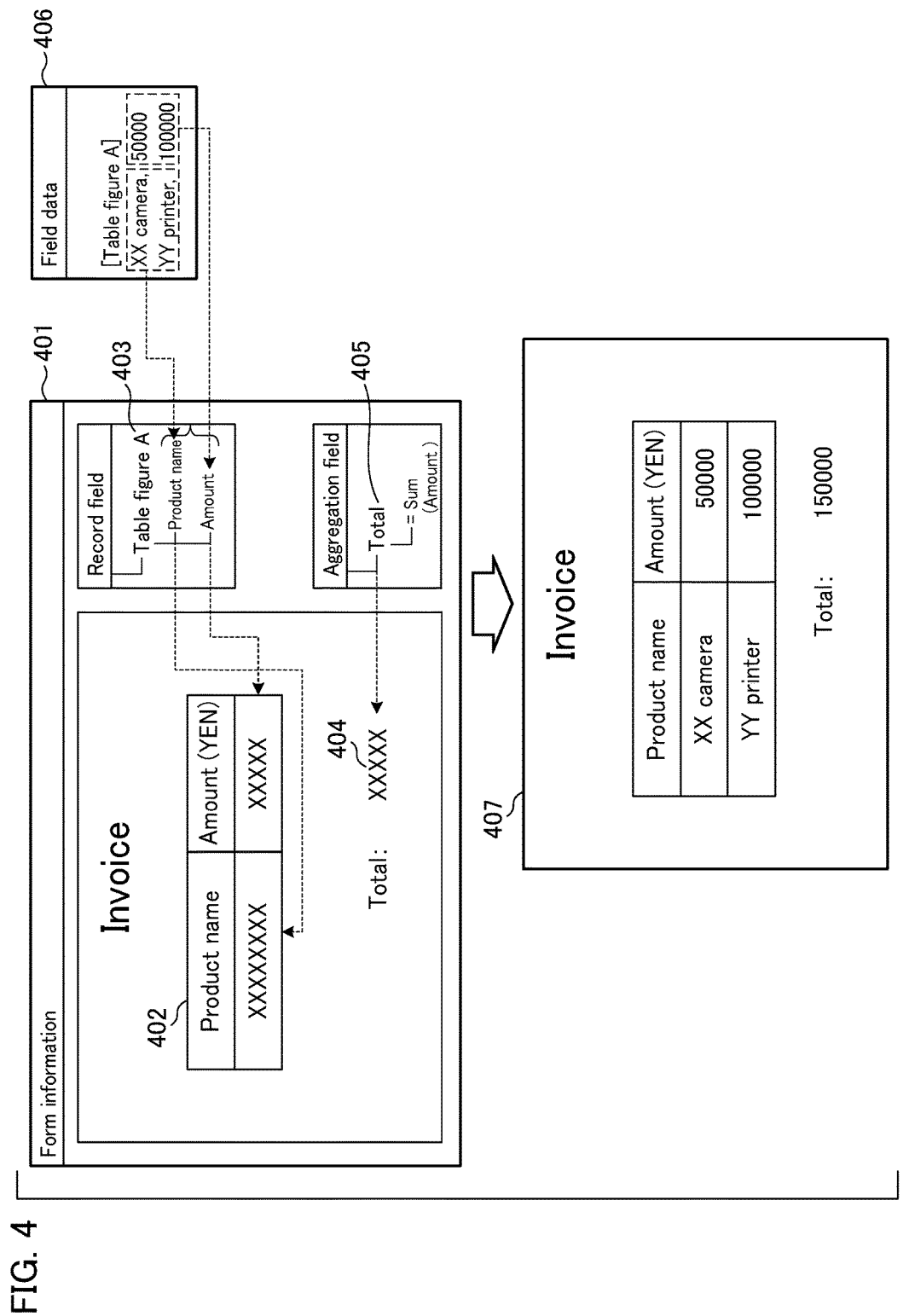
FIG. 4 is a diagram illustrating an overlay output process performed by the business form generating server.

The form information DB 306 stores a form information file. A field data DB 307 stores a field data file. A business form page DB 308 stores a business form page file generated by the business form generating unit 304. The overlay information DB 309 stores an overlay information file generated at the time of the overlay output process of the business form FIG. 4 is a diagram illustrating an overlay output process of a business form performed by the business form generating server.

An overlay output process is a process that overlays form information, which records information such as a frame line of an original paper format, and data in text format (field data). It is possible to output a result of the overlay output process not on paper but as an electronic file. The form information is created by using a dedicated form information design system. The form information is constituted by a fixed figure (form figure) that does not depend on the field data and a figure that displays the received field data in a specified output format (field figure). In order to create the field figure, it is necessary to create an item (field) for accepting the field data in advance. The field is created from the dedicated screen that is displayed by the form information design system. When the field figure is created, association with the field, which is the creation source, is made internally.

In a case of a field FIG. 402, which is in a table format (table figure), since the field data must be accepted in a record unit, a record field 403 is created. A calculation column field is a field in a format that generates field data from a calculation result of data of other field figures. Furthermore, an aggregation field is a field in a format that generates field data by aggregating data in a specified aggregation method. In a case of a field FIG. 404, which field data is to be aggregated and which aggregation method is to be used must be specified. Therefore, an aggregation field 405 is created.

The business form generating server 101 reads a form information file 401, in which the filed figure is defined, and a corresponding field data file 406. Then the business form generating server 101 performs an overlay output process by overlaying the read form information file 401 and the field data file 406. Reference number 407 in FIG. 4 illustrates an example of a result of the overlay output process.

Figure 5:
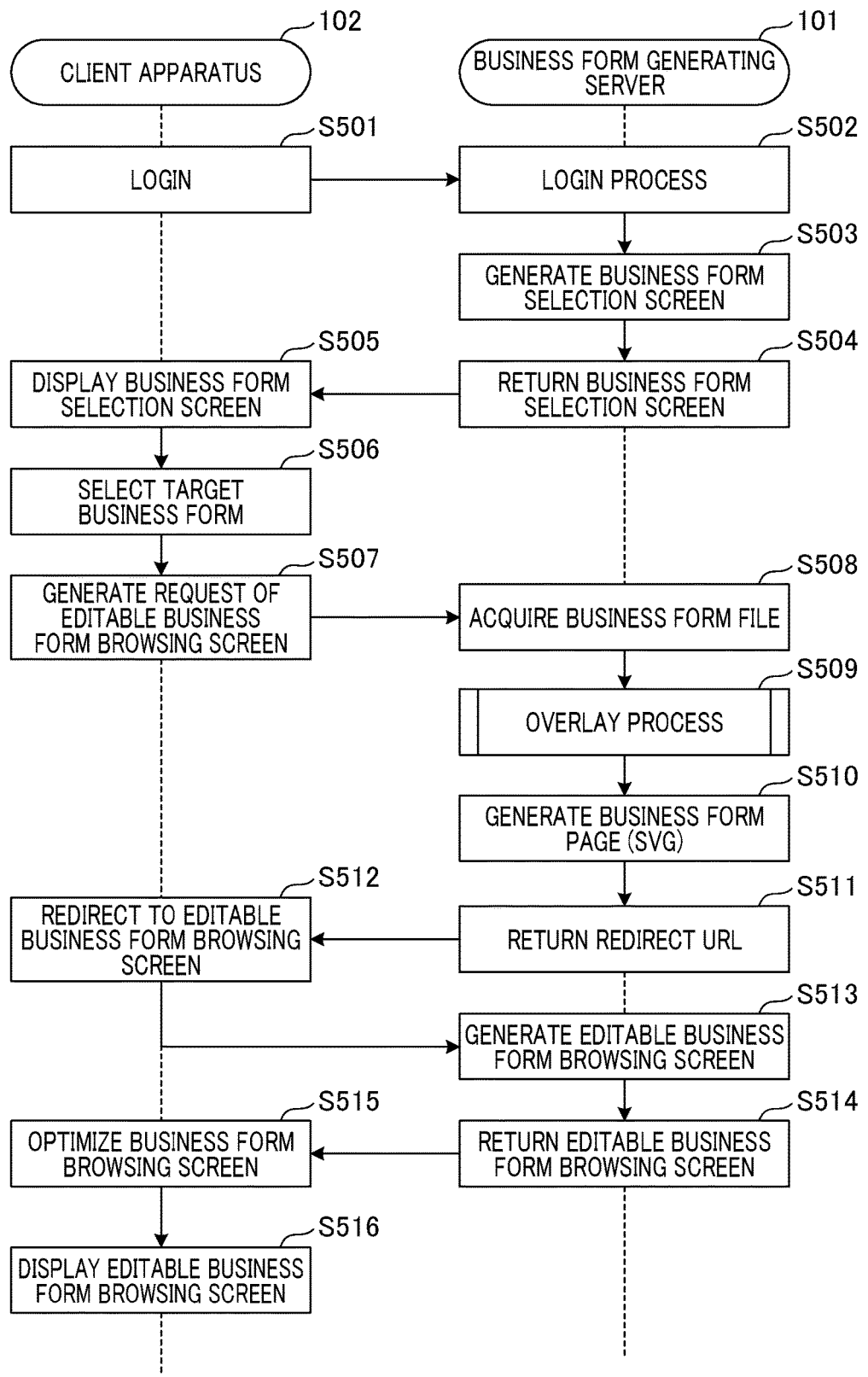
FIG. 5 is a diagram illustrating process to generate an editable business form browsing screen.

FIG. 5 is a diagram illustrating a browsing screen generation process for generating a business form browsing screen.

In step S501, the client apparatus 102 transmits a login request to the business form generating server 101 in accordance with an operation by a user on a login screen displayed on a web browser of the client apparatus 102.

Figure 6:
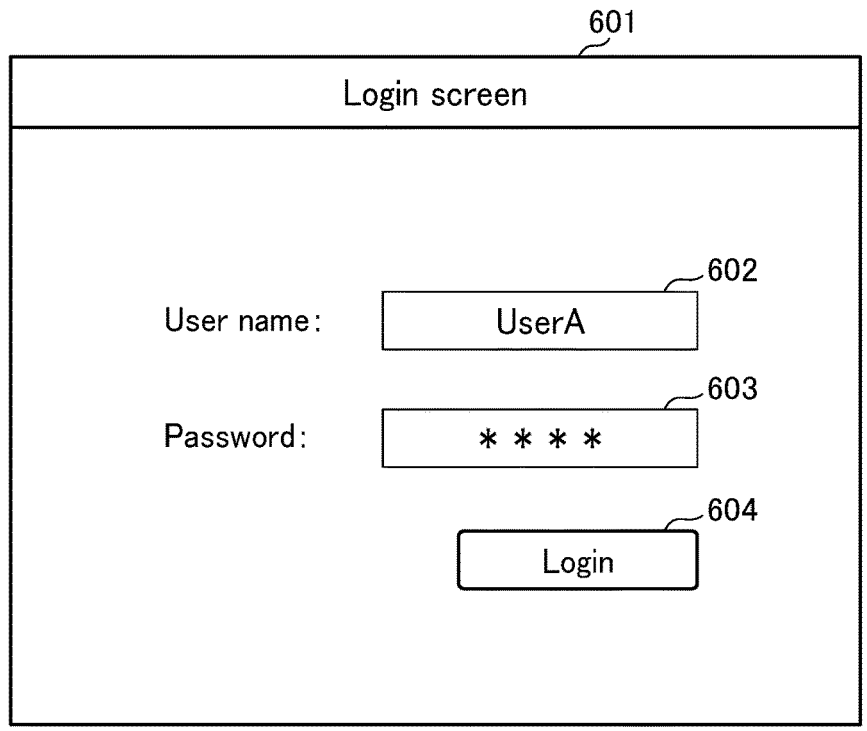
FIG. 6 is a diagram illustrating an example of a login screen.

FIG. 6 is a diagram illustrating an example of a login screen.

A user inputs a user name and a password to a user name input text box 602 and a password input text box 603, and presses down a login button 604. Accordingly, the client apparatus 102 transmits the login request to the business form generating server 101.

The description will return to FIG. 5. In step S502, the access control unit 301 of the business form generating server 101 performs a login process based on the content of the login request received from the client apparatus 102. The access control unit 301 performs Basic authentication and, when the user name and the password are confirmed to be valid, the process proceeds to step S503. Note that, since Basic authentication is a general authentication process, the description thereof will be omitted. In step S503, the page generating unit 302 of the business form generating server 101 generates a business form selection screen in accordance with the information of the login user.

Figure 7:
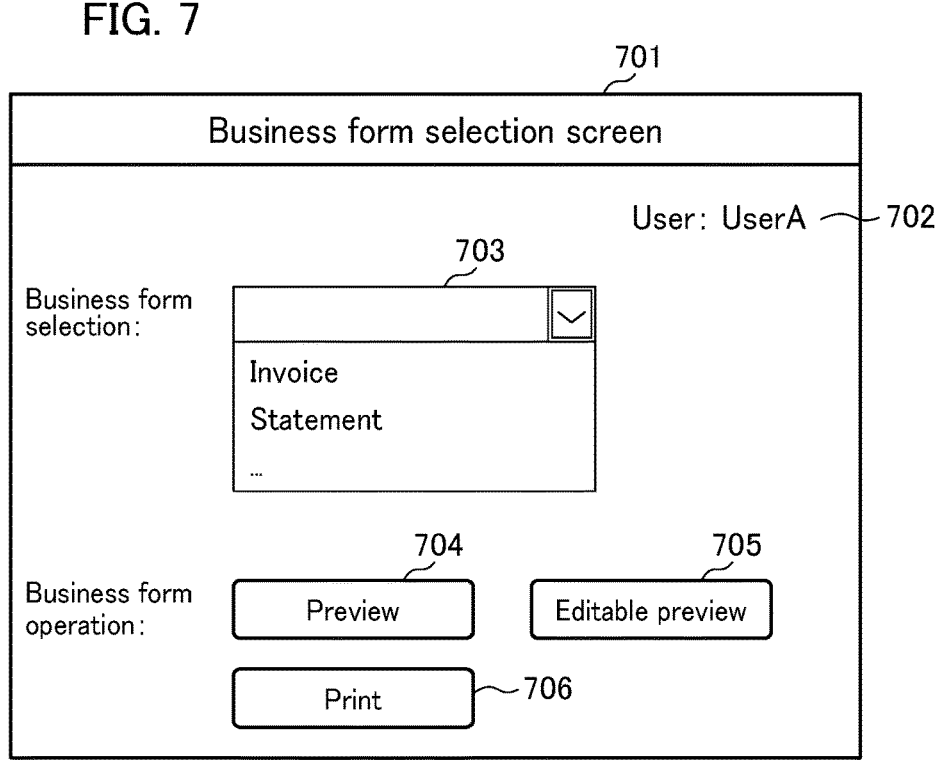
FIG. 7 is a diagram illustrating an example of a business form selection screen.

FIG. 7 is a diagram illustrating an example of a business form selection screen.

In a business form selection screen 701, a user name of a user currently logging in is displayed in an area 702. In a dropdown list 703, a list of business forms that the user currently logged in possesses. Information displayed in the dropdown list 703 is a business form name of the business form that the user currently logged in possesses, which the page generating unit 302 has extracted from the business form data DB 305 via the data access unit 303.

A business form operation button 704 is a button to perform a preview of the business form corresponding to the business form name that is selected on the dropdown list 703. A business form operation button 705 is a button for performing an editable preview of the business form corresponding to the business form name that is selected on the dropdown list 703. A business form operation button 706 is a button for performing a printing operation of the business form corresponding to the business form name that is selected on the dropdown list 703. The process after the editable preview button 705 has been pressed down will be described later, but the process after the preview button has been pressed down and process after the printing button 706 has been pressed down will be omitted.

The description will return to FIG. 5. In step S504, the access control unit 301 of the business form generating server 101 returns the business form selection screen 701 generated in step S503 to the client apparatus 102 via the network 100. In step S505, the client apparatus 102 receives the business form selection screen 701 from the business form generating server 101 and the web browser displays the screen.

In step S506, the user selects the business form name of the business form that the user wants to operate from the dropdown list 703 of the business form selection screen 701. Subsequently in step S507, when the user presses down the editable preview button 705 of the business form selection screen 701, the client apparatus 102 transmits a generating request of the editable business form browsing screen to the business form generating server 101. The generating request of the editable business form browsing screen includes information for specifying the business form to be browsed.

In step S508, the business form generating unit 304 of the business form generating server 101 acquires a form information file that relates to the business form to be browsed from the form information DB 306 via the data access unit 303. In addition, the business form generating unit 304 acquires a field data file that relates to the business form to be browsed from the field data DB 307 via the data access unit 303. In step S509, the business form generating unit 304 of the business form generating server 101 performs the overlay output process by using the form information file and the field data file acquired in step S508.

Figure 8:
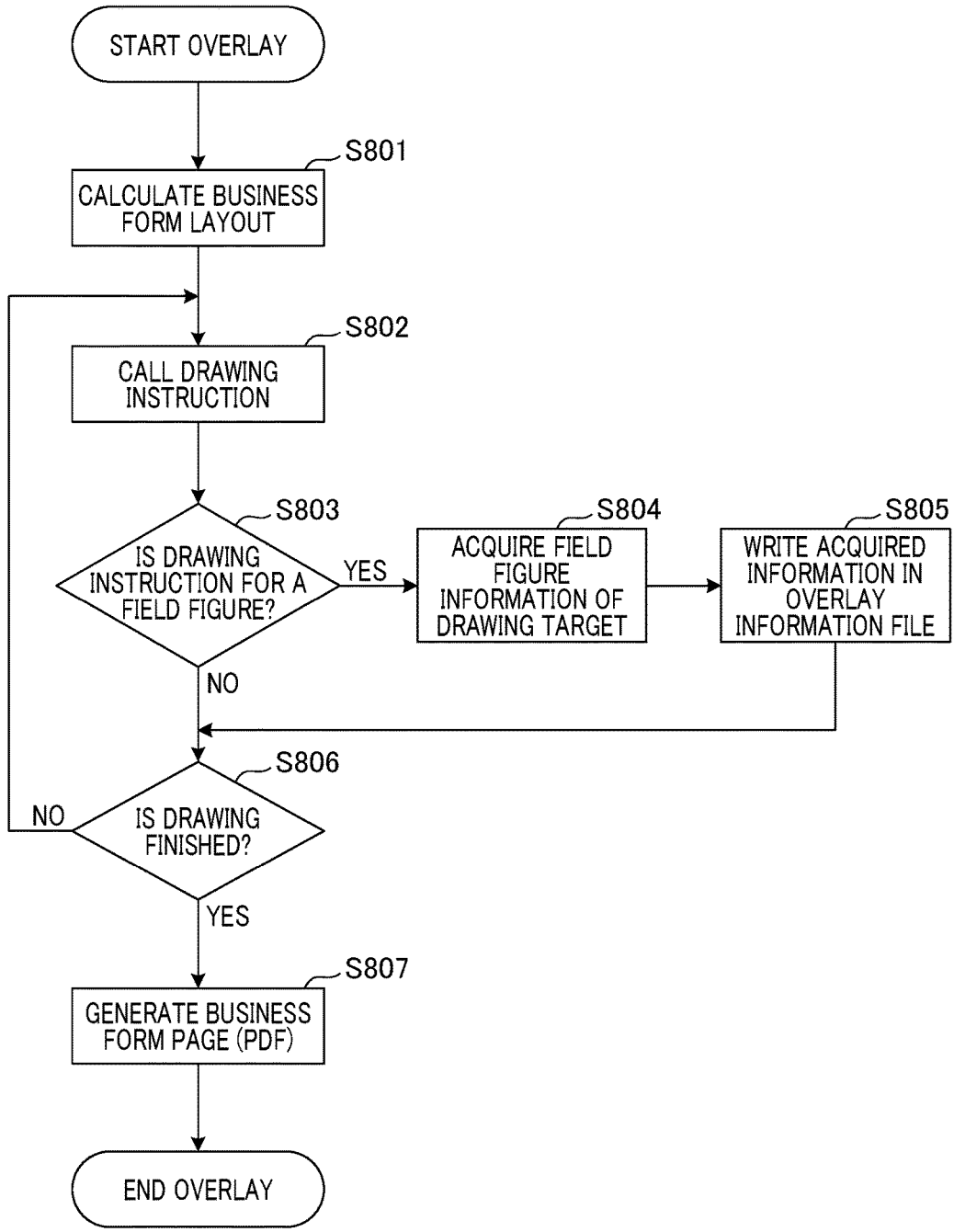
FIG. 8 is a flowchart illustrating the overlay output process.

FIG. 8 is a flowchart illustrating the overlay output process described in step S509 shown in FIG. 5.

In step S801, the business form generating unit 304 calculates a layout configuration of a business form page to be output by using the form information file and the field data file acquired in step S508. Subsequently, in step S802, the business form generating unit 304 sequentially executes a drawing instruction for each figures (form figures that do not depend on the field data and field figures that depend on the field data) in accordance with the layout configuration calculated in step S801.

In step S803, the business form generating unit 304 determines whether or not the drawing instruction executed in step S802 is a drawing instruction for a field figure. If the executed drawing instruction is not a drawing instruction for a field figure, the process proceeds to step S806. If the executed drawing instruction is a drawing instruction for a field figure, the process proceeds to step S804.

In step S804, the business form generating unit 304 acquires information about the target field figure of the drawing instruction executed in step S802. The information to be acquired is a field name of the target field figure, a type of the field figure (such as a record field, an aggregation field, or the like), and various attribute information related to the target field figure. The various attribute information to be acquired includes a drawing position of the figure (data), a figure name, whether or not the figure is inside a table, a line number of the table, whether or not displaying multiple lines is allowed, and the like. The information of the field figure to be acquired is included in the form information file acquired in step S508.

In step S805, the business form generating unit 304 writes the information acquired in step S804 in an overlay information file. When the overlay information file does not exist, the overlay information file is created. Subsequently, the business form generating unit 304 stores the generated overlay information file in the overlay information DB 389 via the data access unit 303. Then the business form generating unit 304 adds information for specifying the generated overlay information file to the corresponding business form record in the business form data DB 305.

Figure 9:
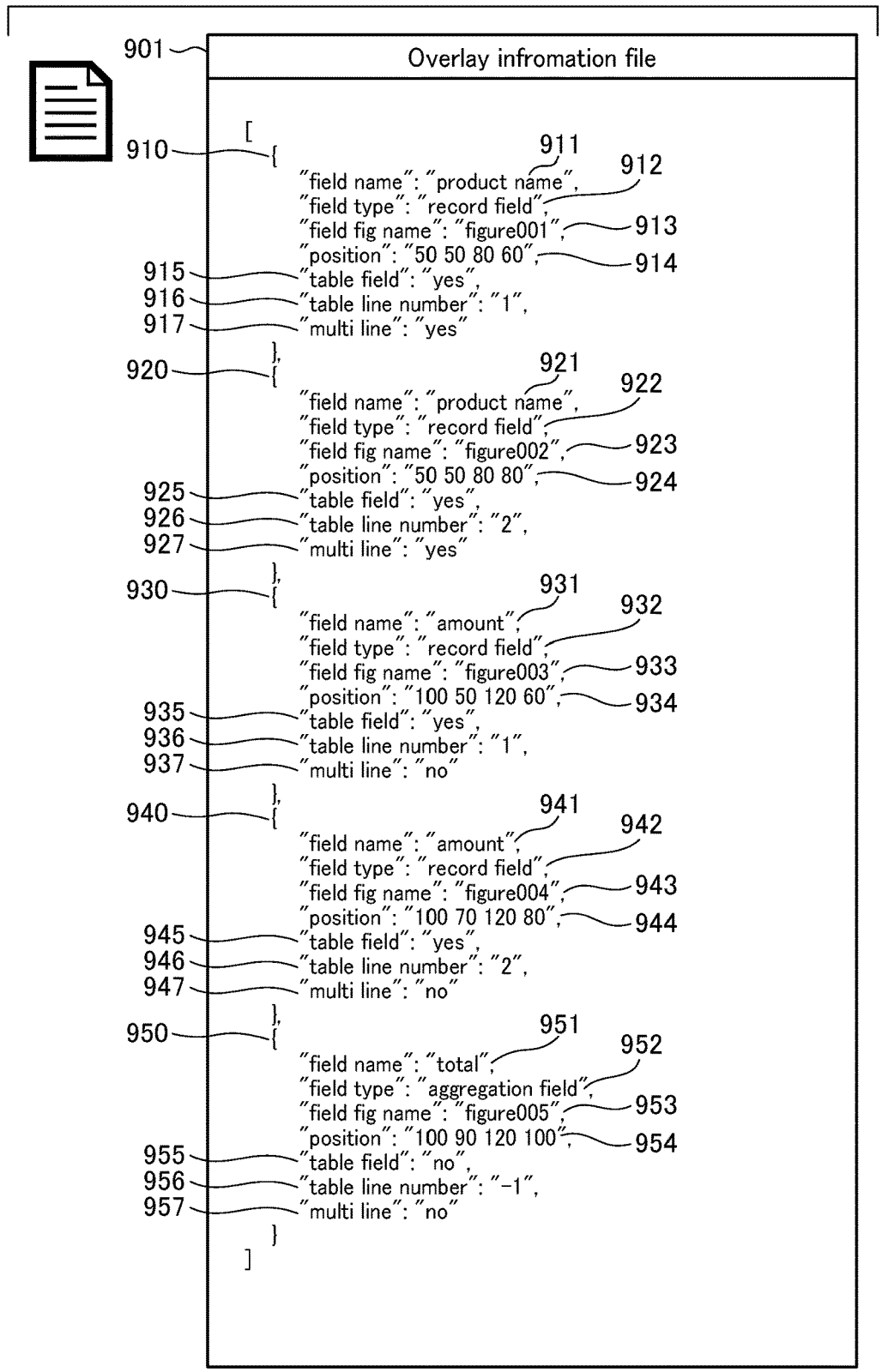
FIG. 9 is a diagram illustrating an example of an overlay information file.

FIG. 9 is a diagram illustrating an example of an overlay information file.

In the present embodiment, the overlay information file is in a JSON format. In an overlay information file 901, field figure information acquired in step S804 is recorded in every field figure. In this example, field figure information relating to 5 field figures of 910, 920, 930, 940, and 950 is recorded. Field name records (911, 921, 931, 941, and 951) indicate field names of the fields associated with the field figures.

Field type records (912, 922, 932, 942, and 952) indicate types of the field (such as a record field, an aggregation field, or the like) associated with the field figures. Field fig name records (913, 923, 933, 943, and 953) indicate field figure names. Position records (914, 924, 934, 944, and 954) indicate drawing positions of the field figures. Table field records (915, 925, 935, 945, and 955) indicate whether the field figures are defined inside a table. For example, if the field figure is defined inside a table, "yes" is recorded as 915, 925, 935, and 945. If the field figure is defined outside a table, "no" is recorded as 955.

Table line number records (916, 926, 936, 946, and 956) indicate at what line number in a table the field figures are defined. As shown 956, if the field figure is outside a table, a value of the table line number record is recorded as "−1". Multi line records (917, 927, 937, 947, and 957) indicate whether or not displaying in multiple lines is allowed when displaying data output to the field figures. If displaying in multiple lines is allowed, "yes" is recorded, as in 917 and 927, and if displaying in multiple lines is not allowed, "no" is recorded, as in 937, 947, and 957.

The description will return to FIG. 8. In step S806, the business form generating unit 304 determines whether all of the drawing instructions are finished. If there is a drawing instruction not finished, the process proceeds to step S802 and the next drawing instruction will be executed. If all of the drawing instructions are finished, the process proceeds to step S807. In step S807, the business form generating unit 304 generates a business form page in PDF format via the virtual printer by using PDL information which is a result of the drawing instruction. The PDL information is information for providing instruction to a printer to draw and is recorded with a page description language.

The description will return to FIG. 5. In step S510, the business form generating unit 304 converts the business form page in PDF format, which is generated in step S807, to a business form page in SVG (Scalable Vector Graphics) format. The business form page in PDF format cannot be directly edited on the web browser, and therefore it is changed in an editable format (SVG format in the present embodiment).

Next, the business form generating unit 304 stores the business in an SVG format form page generated in step S510 in the business form page DB 308 via the data access unit 303. Additionally, the business form generating unit 304 adds information for specifying the generated business form page in SVG format to the corresponding business form record in the business form data DB 305.

Next, in step S511, the business form generating server 101 returns the URL of the editable business form browsing screen requested in step S507 to the client apparatus 102. The URL to be returned includes information for specifying the business form page in SVG format generated in step S510. In the present embodiment, the URL to be returned includes the business form name of business form data associated with the business form page. In step S512, the client apparatus 102 transmits a request for redirecting to the editable business form browsing screen (redirect request) to the business form generating server 101 by using the URL returned in step S511.

Subsequently, in step S513, the page generating unit 302 of the business form generating server 101 generates data for an editable business form browsing screen (business form browsing screen data) in accordance with the content of the redirect request transmitted in step S512. The generated business form browsing data includes the business form page of the business form that has been requested, a control program (JavaScript program) for browsing the business form page, editing the business form page and controlling a printing operation of the business form page, and overlay information required at the time of an editing operation. The page generating unit 302 acquires the business form page and the overlay information file associated with the business form that has been requested from the business form page DB 308 and the overlay information DB 309 via the data access unit 303 based on the business form name included in the redirect request. Additionally, the page generating unit 302 includes each of the acquired data in the business form browsing screen data.

In step S514, the business form generating server 101 returns the business form browsing screen data generated in step S513 to the client apparatus 102. In step S515, the client apparatus 102 receives the response from the business form generating server 101, and performs an optimization process on the business form browsing screen data included in the response. Although the business form browsing screen data includes a file in HTML format, a business form page in SVG format, an overlay information file, and a JavaScript program, the optimization process is executed on the business form page in SVG format.

Figure 10A:
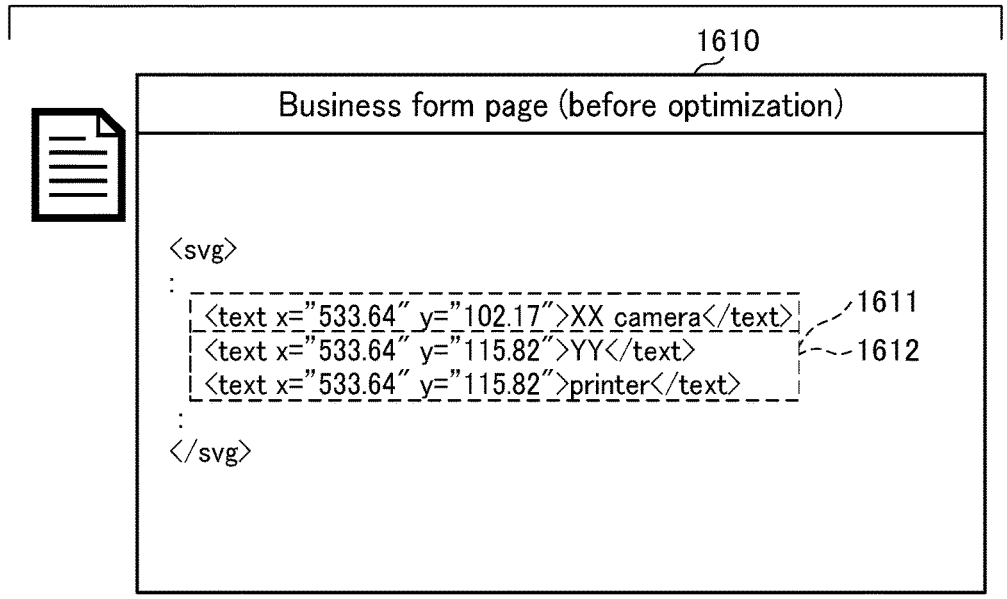
FIGS. 10A and 10B are diagrams illustrating an example of a business form page on which optimization process is performed.
Figure 10B:
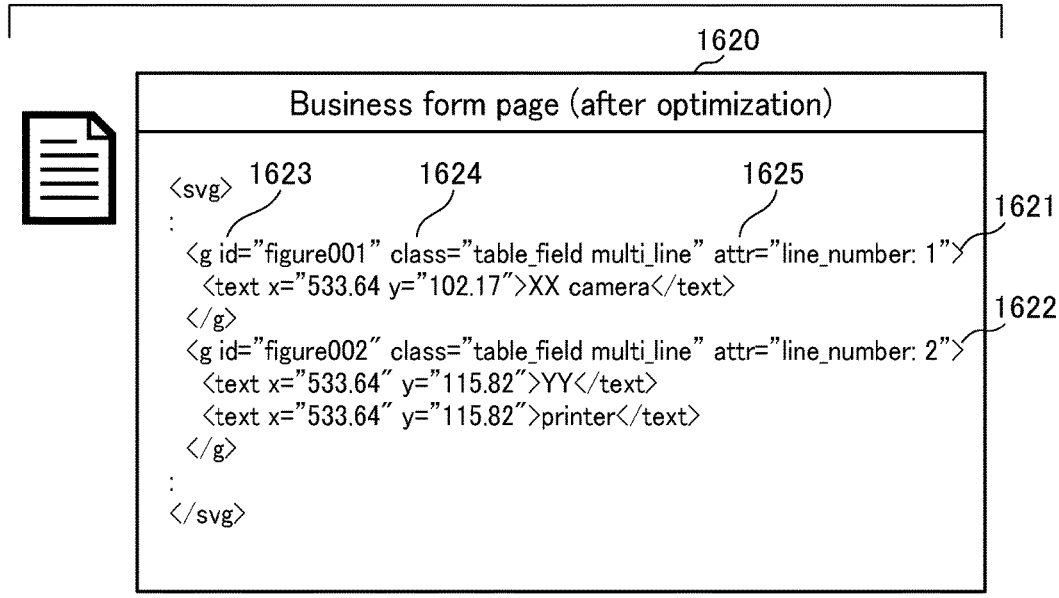

FIGS. 10A and 10B are diagrams illustrating an example of a business form page on which optimization process is performed.

A business form page 1610 shown in FIG. 10A is a business form page before the optimization process has been performed. The "text" tags (text elements) of SVG format 1611 and 1612 indicate values of the data of each field figures and coordinates of the drawing position. In the "text" tag 1611, a value of data of one field figure is output as one "text" tag. In contrast, when creating a business form page in SVG format via PDL information, there is a case that one piece of the field figure information is divided in a plurality of "text" tags and output as the "text" tag 1612. In addition, none of the "text" tags have business form specific information (such as field figure name, or the like). When performing an editing operation of the business form, each of the "text" tags must be associated with the business form specific information, such as attribute information related to the field figure or the layout thereof. Accordingly, the optimization process (attribute addition process) of the business form page is performed.

A business form page 1620 shown in FIG. 10B is a business form page after the optimization process is performed. "g" tags (group tag, "g" element) 1621 and 1622 unify each of the "text" tags for each of the field figures. Furthermore, the business form specified information is added to the "g" tag as an attribute, and thereby, the "text" tag is associated with the business form specified information. In this example, in the "g" tag 1621, the field figure name is added as an id attribute 1623. Also, in the "g" tag 1621, whether or not it is inside a table and whether or not displaying in multiple rows is allowed are added as class attribute 1624. Furthermore, in "g" tag 1621, the line number in the table is added as "attr" attribute 1625.

Figure 11:
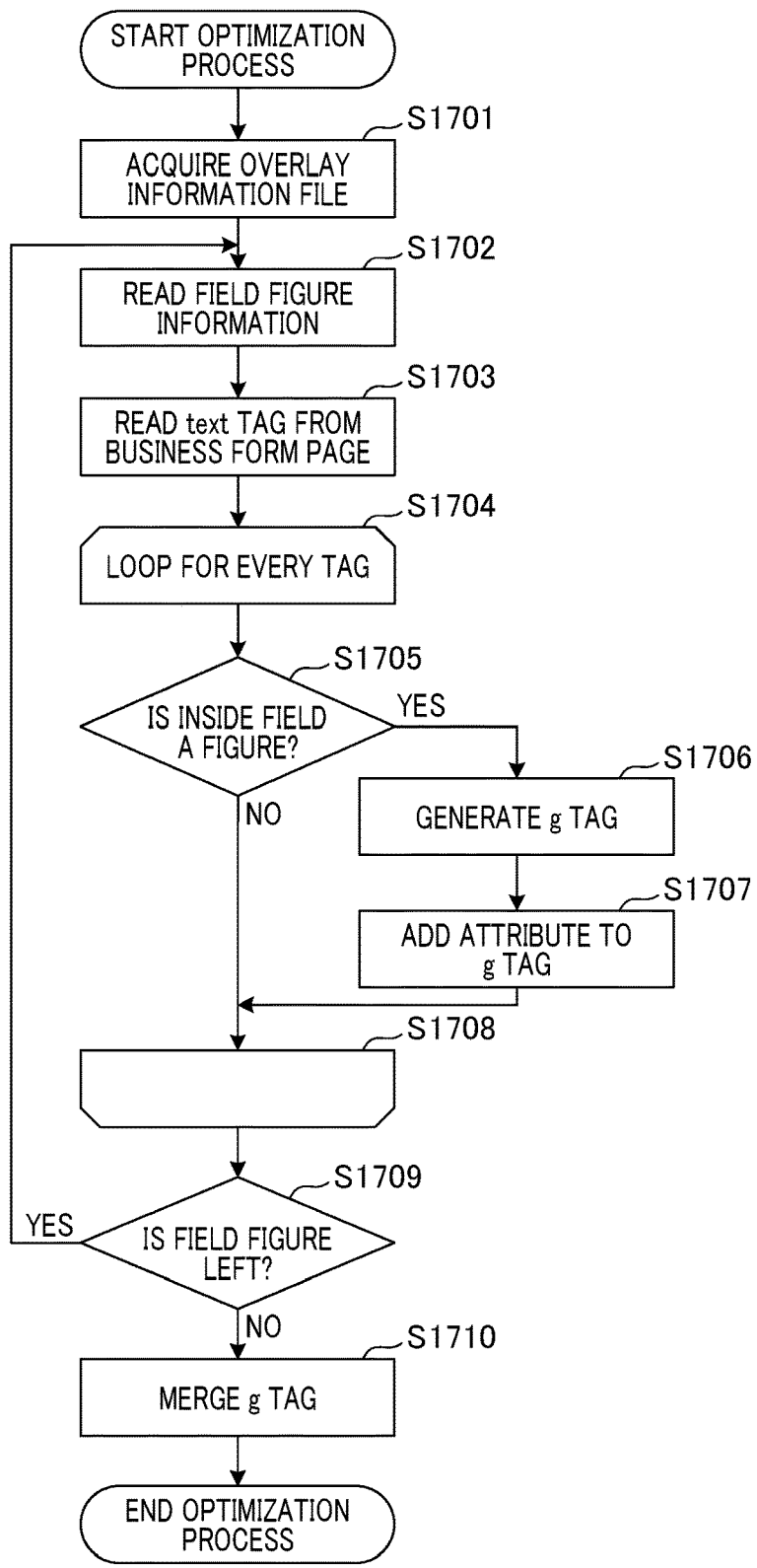
FIG. 11 is a flowchart illustrating the optimization process of the business form page.

FIG. 11 is a flowchart illustrating the optimization process of the business form page.

In step S1701, the client apparatus 102 acquires the overlay information file 901 included in the business form browsing screen data, which was returned from the business form generating server 101 in step S514. In step S1702, the client apparatus 102 reads the overlay information file 901 acquired in step S1701 and acquires one of the field figure information.

In step S1703, the client apparatus 102 reads a "text" tag of the business form page in SVG format. If there is a plurality of "text" tags, the plurality of "text" tags is read. In step S1704 to step S1708, the client apparatus 102 performs the process of step S1705 to step S1707 on each of the "text" tags read in step S1703.

In step S1705, the client apparatus 102 determines whether or not the "text" tag read in step S1703 is included in the field figure. More specifically, whether or not the leading coordinates of a character string that is to be drawn by the "text" tag (a value of the x and y attributes of the "text" tag) are included inside a rectangular of the field figure indicated by the position record of the field figure information read in step S1702. If the "text" tag is not included in the field figure, the process proceeds to step S1708. If the "text" tag is included in the field figure, the process proceeds to step S1706. In step S1706, the client apparatus 102 generates a "g" tag that surrounds the "text" tag.

In step S1707, the client apparatus 102 adds various attributes to the "g" tag generated in step S1706. More specifically, a value of the field fig name record of the field figure information read in step S1702 (field figure name) is added as a value of the id attribute of the "g" tag. Also, if the value of the table field record of the field figure information is "yes", a value of the class attribute of the "g" tag is added as table_field. Furthermore, a value of the table line number record of the field figure information is added as a value of the "attr" attribute of the "g" tag as attr="table_line_number: n". The acquired line number is recorded in the n. In addition, if the value of the multiline record of the field figure information is "yes", a value of the class attribute of the "g" tag is added as "multi_line".

In step S1708, if there is an unprocessed "text" tag that is read in step S1703, the process returns to step S1704 and the loop process is performed to the "text" tag. In step S1709, the client apparatus 102 determines whether unprocessed field figure information exists in the overlay information file 901 acquired in step S1701. If there is unprocessed field figure information, the process returns to step S1702 and next field figure information is read. If there is no unprocessed field figure information, the process proceeds to step S1710.

In step S1710, the client apparatus 102 performs merge process of the "g" tag. In the business form page in SVG format, since there is a case in which one piece of the field figure information is divided in a plurality of "text" tags and output as the "text" tag 1612, there is a possibility that there is a plurality of "g" tags having the same field figure name in the "id" attribute. Therefore, in the merge process, the "g" tags having the same field figure name are unified into one.

The above is the description of the optimization process (attribute addition process) of the business form page. Note that the optimization process does not have to be performed after the client apparatus 102 receives the business form browsing screen data from the business form generating server 101 in step S515, but may be performed every time the business form page is edited on the business form browsing screen. Furthermore, the optimization process does not have to be performed not by the client apparatus 102, but, for example, may be performed by the business form generating server 101 in advance.

The description will return to FIG. 5. In step S516, the client apparatus 102 displays the editable business form browsing screen on the web browser based on the business form browsing screen data on which the optimization process is performed in step S515. The above is the description of the process for generating the editable business form browsing screen data using FIG. 5.

Figure 12:
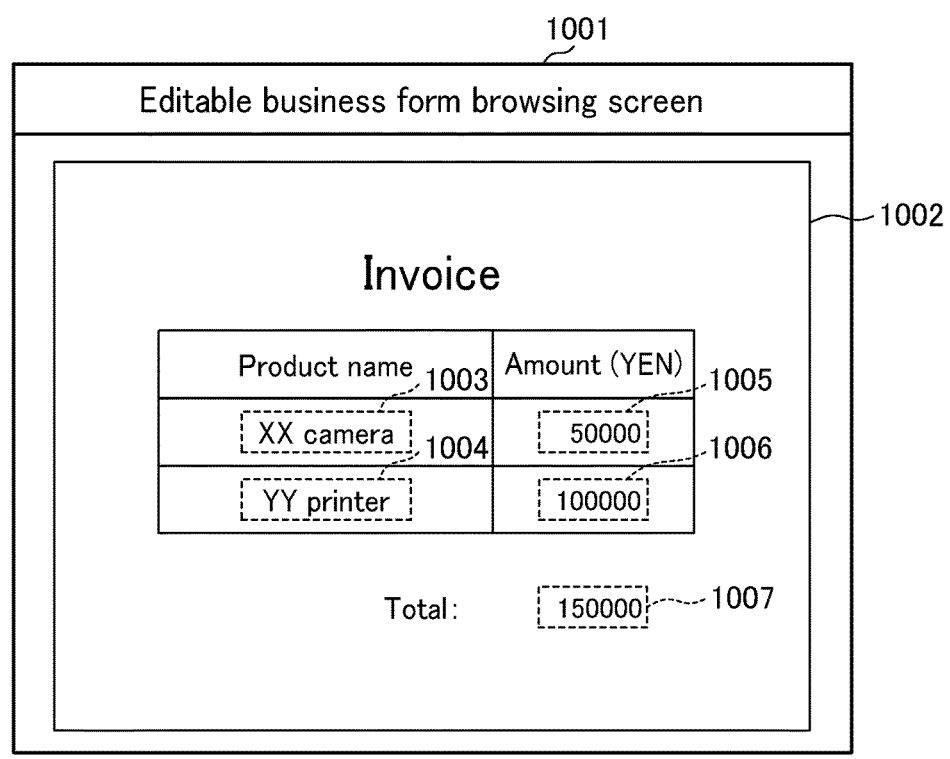
FIG. 12 is a diagram illustrating an editable business form browsing screen.

FIG. 12 is a diagram illustrating an editable business form browsing screen in the present embodiment.

An area 1002 of a business form browsing screen 1001 is an area for displaying the business form page in SVG format. If a flick operation in a horizontal direction is performed inside the area 1002, the business form page can be switched to the preceding or following business form page. In an area 1003 and an area 1004, a drawing result of a "product name" record in the record field is displayed. Also, in an area 1005 and an area 1006, a drawing result of an "amount" record in the record field is displayed. Furthermore, in an area 1007, a drawing result of a "total" record in the aggregation field is displayed. Value and coordinates information for the area 1003 and the area 1004 are recorded in the "text" tag surrounded by the "g" tag 1621 and the "g" tag 1622 of the business form page in SVG format after the optimization process has been performed (FIG. 10B). If a user performs a click operation in the area 1002, the business form browsing program in the editable business form browsing screen operates and the editing process described with reference to FIG. 13 is performed.

Figure 13:
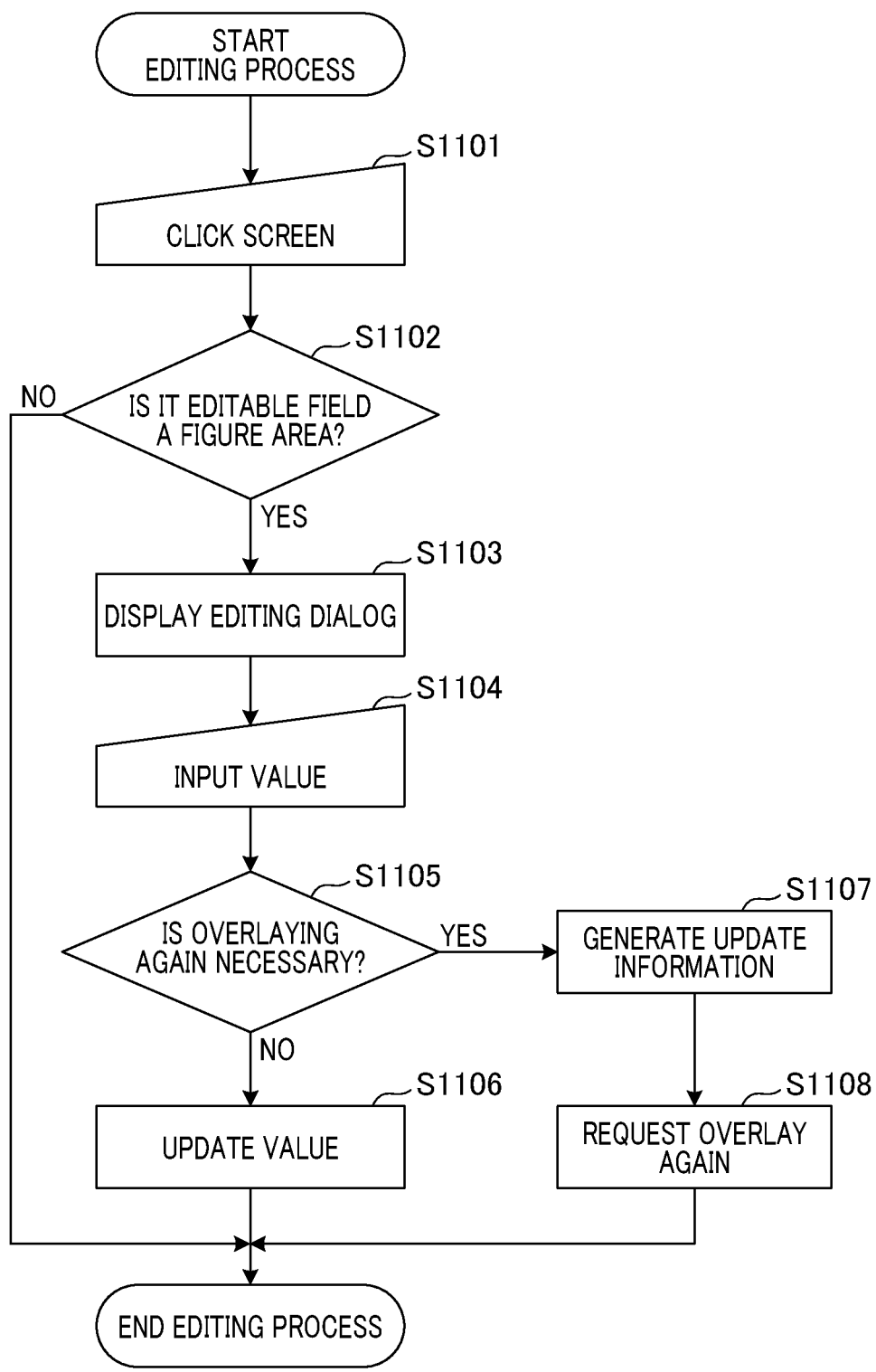
FIG. 13 is a flowchart illustrating editing process on the editable business form browsing screen.

FIG. 13 is a flowchart illustrating the editing process in accordance with an editing operation on the editable business form browsing screen in the present embodiment.

In step S1101, the user performs a click operation inside the area 1002 of the editable business form browsing screen 1001. Subsequently, in step S1102, the business form browsing program included in the business form browsing screen data determines whether the position clicked position in step S1101 is inside the area of the editable field.

More specifically, the determination whether the clicked position is inside the area of the editable field is performed as follows. Firstly, the business form browsing program specifies the tag element of the business form page in SVG format, which exists on the clicked position. To acquire the tag element that exists on the clicked position, a standard JavaScript API, which is provided by the web browser, is used. In addition, if only the element can be specified, it is not limited thereto and, for example, an external library such as jQuery or the like may be used.

Subsequently, the business form browsing program determines whether or not the clicked tag element is a "text" tag. If it is a "text" tag, the business form browsing program confirms whether or not the id attribute has been added to the "text" tag. If the clicked tag element is a "text" tag and is included in a field figure, a field figure name is added as a value of the id attribute of the "text" tag in step S1707 of FIG. 11. If it is a "text" tag indicating not a field figure but data of a form figure or the like, the id attribute is not added in the "text" tag. In other words, if the clicked tag element is a "text" tag and the id attribute is added in the "text" tag, it is determined that the clicked position is inside the area of the editable field.

Note that whether or not the clicked position is inside the area of the editable field may be determined in accordance with the type of the field. More specifically, a value of the field type record of the overlay information file 901 is added as an attribute of the "g" tag of the business form page in SVG format in the optimization process (in step S1707 of FIG. 11). Additionally, for example, editing of the aggregation field does not need be performed. In the present embodiment, the aggregation field is editable.

Figure 14A:
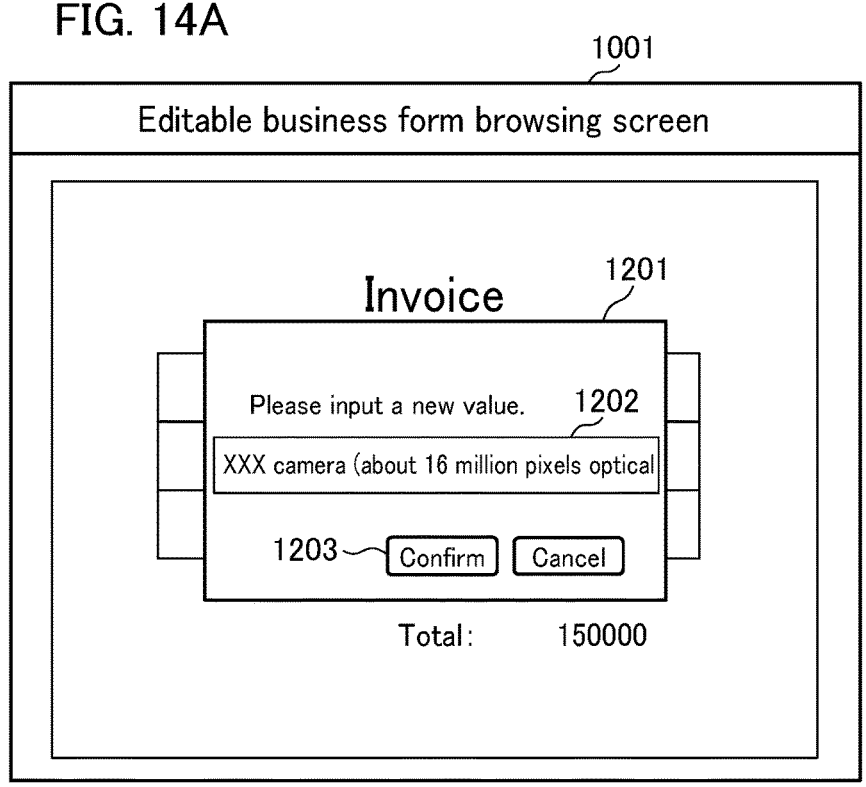
FIGS. 14A and 14B are diagrams illustrating an example of the business form browsing screen on which an editing operation has been performed.

If the clicked position is inside the area of the editable field, the process proceeds to step S1103. If the clicked position is not inside the area of the editable field, the process ends. In step S1103, the business form browsing program displays an editing dialog 1201. In the present embodiment, in case that the area 1003 to 1007 of the editable business form browsing screen 1001 is clicked, an editing dialog 1201 is displayed. FIG. 14A is a displaying example of the editing dialog.

In step S1104, the user inputs a new value in the textbox 1202 of the editing dialog 1201 and clicks a confirmation button 1203. In this example, assume that a value of "XXX camera (about 16 million pixels optical 8× zoom gray)" is input. In step S1105, the business form browsing program determines whether or not a re-creation of the business form page (overlay again) is necessary.

More specifically, the business form browsing program confirms whether or not the value that the user has input in step S1104 is the same as the value (character string) of the "text" tag (the clicked "text" tag) specified in step S1102. If the value is the same, it is determined that the re-creation of the business form page is not necessary. If the value is not the same, the business form browsing program confirms whether or not the table_field and the multi_line are recorded as the values of the class attribute added to the specified "text" tag. If the table_field and the multi_line are both recorded, it is determined that the re-creation of the business form page is necessary. If the table_field and the multi_line are not both recorded, it is determined that the re-creation of the business form page is not necessary.

In the case that the table_field and the multi_line are recorded as the values of the class attribute, it is indicating that there is the following setting. Specifically, in the field figure information of the form information file 401, a field figure inside a table is set to display a character by wrapping and in a multiple line according to data. In order to perform such a display, information of a character width for each font of each character is necessary, but in the business form page in SVG format, information thereof is not included. In other words, in accordance with a value (a character string) that the user has input, there may be a case in which a width of the character string exceeds the width of the rectangle of the field figure. However, since there is no information for the width of the character for each font of each character, for which character the width of the rectangular is exceeded cannot be determined.

Furthermore, including the information for the character width in the overlay information may be considered, but as the character that the user will input cannot be known beforehand, it is necessary to have information for all of the fonts of all of the compatible characters that the business form system. This will be a huge amount of data, and therefore it is not realistic considering the performance or processing efficiency of a memory or the like. Accordingly, in the present embodiment, in step S1105, if the table_field and the multi_line are both recorded as the value of the class attribute added to the "text" tag, it is determined that the re-creation of the business form page is necessary. By this manner, the setting of the form information file 401 can be realized.

Note that in the present embodiment, whether or not the re-creation of the business form page is necessary is determined based on the class attribute, but it is not limited thereto. It may be determined by combining other conditions. For example, in a case that a use of a fix-width font (monospaced font) is recorded as a font for drawing in the field figure information, the following condition may be considered. If the fix-width font is used, since the character widths of all of the characters are the same, the count the number of characters of the character string that the user has input, and the width of a character×the number of the characters (a valued that can be obtained by multiplying a character width by the number of character) is set to be the width of the character string. Then the width of the character string is compared with the width of the rectangle of the field figure (predetermined value), and if the width of the character string exceeds the width of the rectangle, it is determined that re-creation of the business form page is necessary. Accordingly, further reducing the work load for the re-creation of the business form page will be possible.

In step S1105, if the recreation of the business form page is not necessary, the process proceeds to step S1106. If the recreation of the business form page is necessary, the process proceeds to step S1107. In step S1106, the business form browsing program updates (replaces, reflects) the value of the "text" tag specified in step S1102 with the value input by the user in step S1104. In step S1107, the business form browsing program performs creation of update information. The update information is information required for recreating the business form page in which the value input by the user is reflected.

Figure 15:
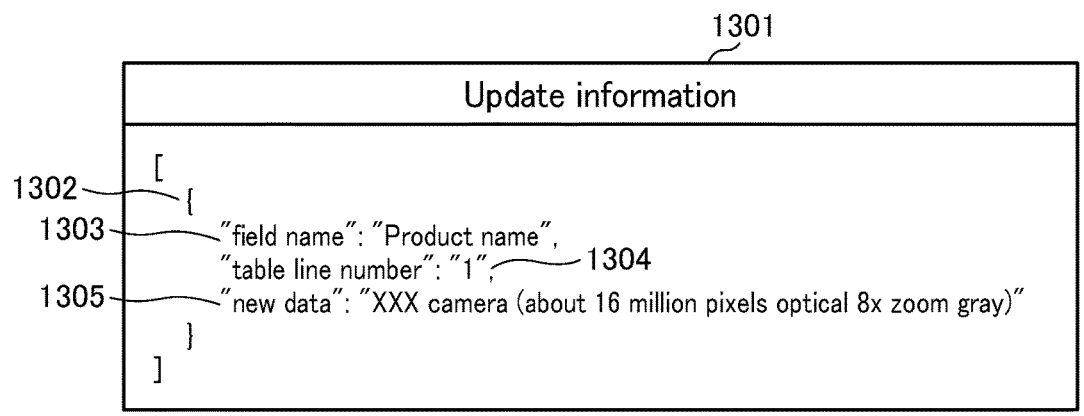
FIG. 15 is a diagram illustrating an example of update information relating to edited data.

FIG. 15 is a diagram illustrating an example of the update information.

Reference number 1302 indicates information about the field changed due to editing the business form on the business form browsing screen 1001. Reference number 1303 indicates a field name of the changed field. Reference number 1304 indicates a line number in a table of the changed field. Reference number 1305 indicates a value of the field changed by the user. In other words, reference number 1305 is the value input by the user in step S1104. As other information, information for a "g" tag surrounded by the "text" tag specified in step S1102 is acquired.

The description will return to FIG. 13. In step S1108, the business form browsing program transmits request for recreating the business form browsing screen to the business form generating server 101. Update information 1301 created by the business form browsing program in step S1107 is included in the request. The business form generating server 101 receives the request for recreating the business form browsing screen and updates the field data of the corresponding business form stored in the field data DB 307 based on the update information included in the request.

Figure 16:
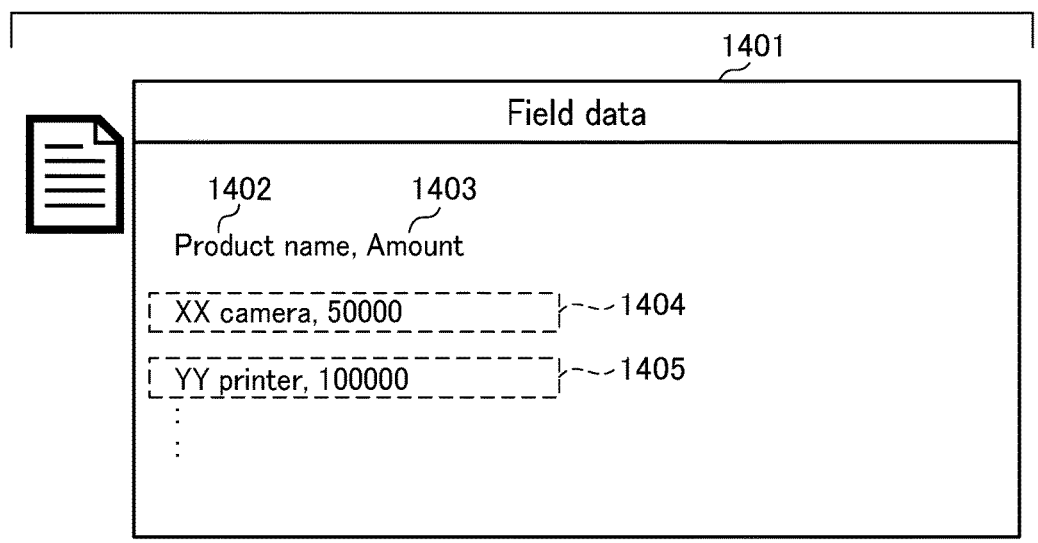
FIG. 16 is a diagram illustrating an example of field data before editing.

FIG. 16 is a diagram illustrating an example of field data 1401 before updating.

In field data, field names 1402 and 1403 are recorded in a first row, and in the second row and thereafter, data of each row of a table is recorded. Specifically, a record 1404 is data of the first row of the table and a record 1405 is data of the second row. In step S1108, the business form generating server 101, which has received the request of recreating the browsing screen from the business form browsing program, specifies a place of the data to be updated from the field name 1303 and the line number 1304 of the table in the update information 1301 included in the request. Subsequently, the business form generating server 101 overwrites the data of the specified place by using the value 1305 input by the user included in the update information 1301. Then the business form generating server 101 executes the process after step S508 in FIG. 5.

Figure 14B:
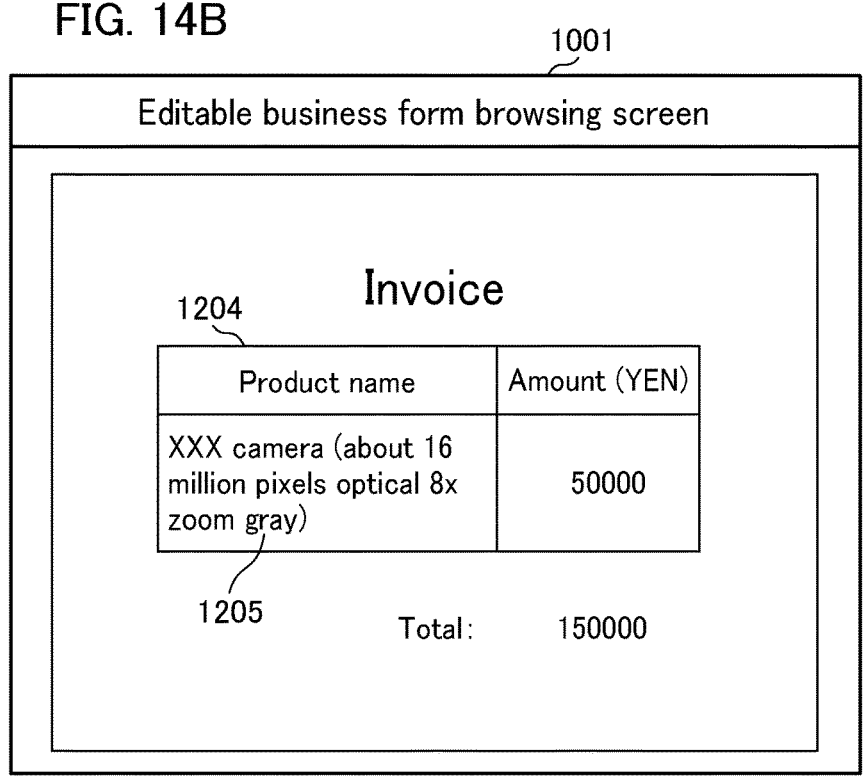

FIG. 14B is a diagram illustrating an example of the recreated business form browsing screen.

In a field FIG. 1205, since the value of the data will be displayed in multiple rows, a height of the row increases and the number of rows of a table 1204 displayed in the business form page will be 1. Note that data after the second row of the table will be displayed after the following business form page (not shown).

As described above, according to the present embodiment, if the business form page is edited, whether or not the overlay output process is performed again is appropriately determined, and the editing operation can be performed easily. Accordingly, in a case in which the editing of the business form page affects the layout, creating a business form page that has reflected the setting of the form information can be performed.

Second Embodiment

In the present embodiment, at the time that the editing operation of the business form is performed by the user, a description of a case in which the re-creation (overlaying again) of the business form page is not necessary will be given. For example, in the field figure information of the form information file 401, assume that the field figure inside the table is set so as to not allow displaying the multiple rows according to the data. Note that a case in which the other setting is the same as the first embodiment is considered.

Figure 17A:
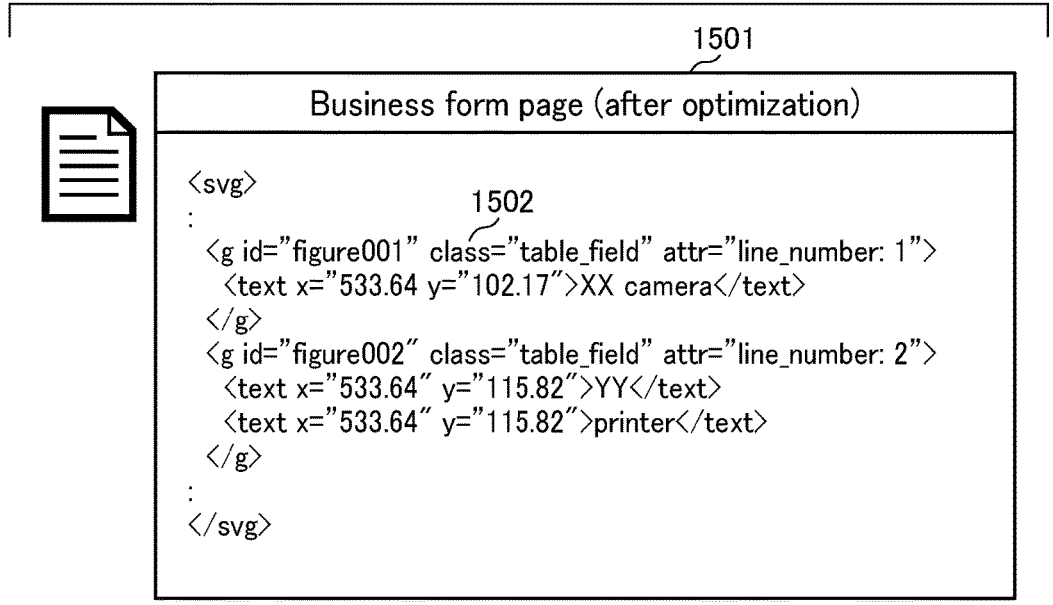
FIGS. 17A and 17B are diagrams illustrating an example of the business form browsing screen to which the editing operation has been performed.

FIG. 17A is a diagram illustrating a business form page after the optimization process has been performed.

In the present embodiment, in the field figure information of the form information file 401, the field figure inside the table is set to not allow displaying the multiple rows according to the data. Accordingly, in a class attribute 1502 in a "text" tag of a business form page 1501 on which the optimization process has been performed, the multi_line is not added. Therefore, if an editing operation is performed on the business form browsing screen, in step S1105 of the editing process, the business form browsing program determines that the re-creation of the business form page is not necessary and thereby the re-creation of the business form browsing screen is not performed.

Figure 17B:
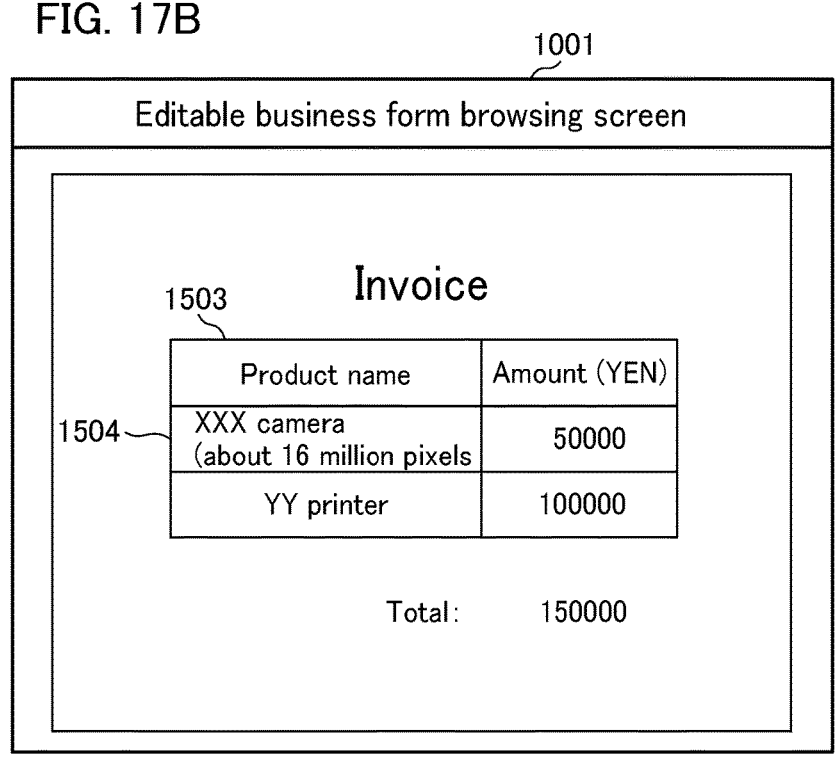

FIG. 17B illustrates an example of the business form browsing screen after having been edited by the user, which is displayed in step S1106 of the editing process, when the editing operation is performed by the user on the business form browsing screen.

The number of rows of a table 1503 is still 2 rows, which is different from FIG. 14B of the first embodiment, and the value of the data in the field FIG. 1504 is displayed as the value input by the user is truncated in the middle of the value. This results from displaying based on the setting of the form information file 401 and, in the present embodiment, the overlay output process is not performed again.

As described above, according to the present embodiment, if the business form page is edited, whether or not the overlay output process is performed again is appropriately determined and the editing operation can be performed easily. Accordingly, if the business form pages are changed, performing the overlay output process again is suppressed, and thereby a deterioration (delay) in performance of the editing operation on the browser can be suppressed.

Third Embodiment

In the present embodiment, at the time when the editing operation of the business form is performed by the user, a description of another case in which the re-creation (overlaying again) of the business form page is necessary will be given.

FIGS. 18A and 18B are diagrams illustrating an example of the editable business form browsing screen according to the preset embodiment. In the business form browsing screen 1001 shown in FIG. 18A, in a "purchase data" field 1801 of the business form browsing screen, field figures that have a same value in "purchase date" are omitted in accordance with the setting of the form information file 401. In other words, if the field figure has a same value, the setting to draw the table by omitting values after the leading value is reflected. More specifically, values of field FIGS. 1803 and 1804 are "2014/11/05", which is as same as a value of data of a field FIG. 1802, and thereby drawing thereof are omitted.

Here, in the business form browsing screen, if the value of the field FIG. 1802 is changed to "2014/11/25", the data of the field FIG. 1802 will be different from the data of the field FIGS. 1803 and 1804. In such case, the business form browsing program determines that the overlay output process is necessary again in step S1105 of the editing process, and the re-creation of the business form browsing screen is performed in the business form generating server 101. Since the flowchart of the editing process is the same as the flowchart of the first embodiment illustrated in FIG. 13, the description thereof will be omitted. A description will be given of process of a case in which the overlay output process is performed again by using FIG. 8. Note that the description will be omitted with respect to the same part with the first embodiment, and descriptions of only the different parts will be given.

In step S804, the business form generating unit 304 acquires information for the target field figure of the drawing instruction executed in step S802. Here, whether or not "drawing setting at the time of omitting the same value", which is one piece of the attribute information for the target field figure, is set is also acquired from the form information file. In step S805, the business form generating unit 304 writes the information including the "drawing setting at the time of omitting the same value", which is acquired in step S804, in the overlay information file.

Figure 19:
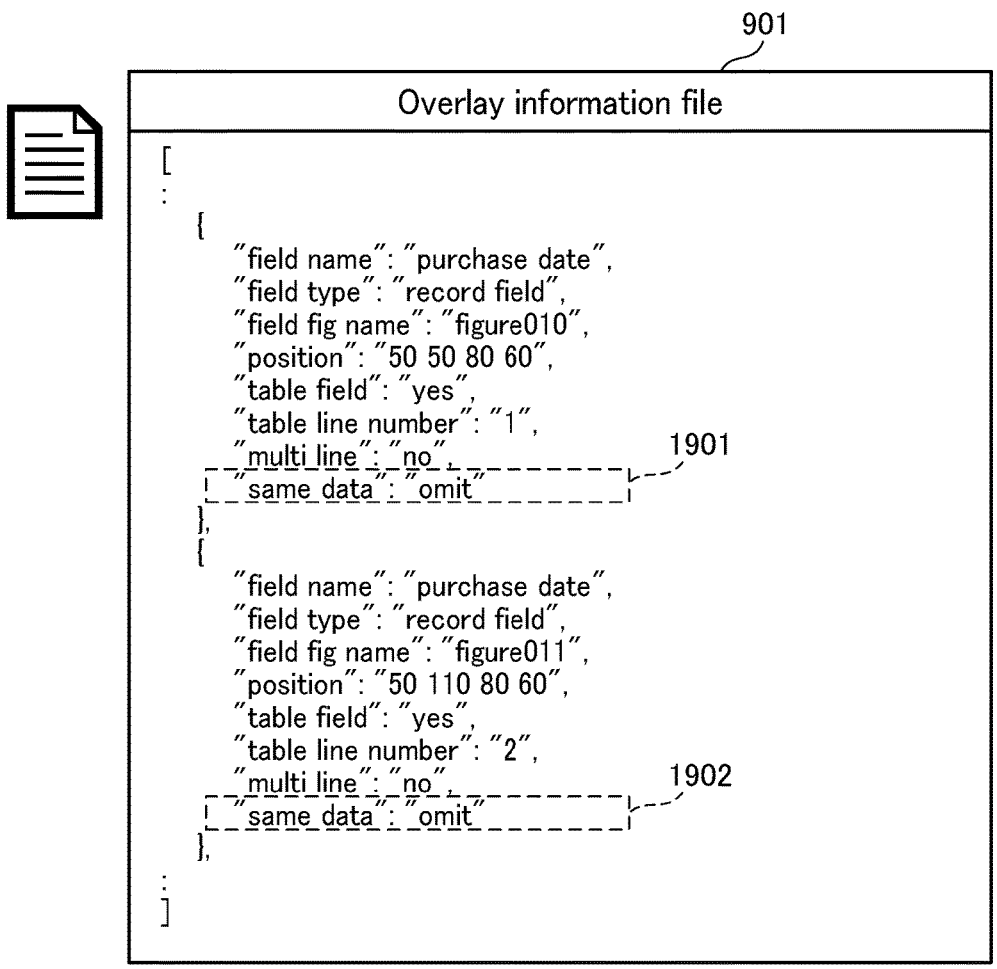
FIG. 19 is a diagram illustrating an example of an overlay information file.

FIG. 19 is a diagram illustrating an example of the overlay information file.

In records 1901 and 1902 of the overlay information file 901, "drawing setting at the time of omitting the same value" is recorded. In step S1707 (FIG. 11) of the optimization process, the client apparatus 102 adds the "attr" attribute to the "g" tag of the business form page in SVG format, which is the target of the optimization process, based on the records 1901 and 1902 acquired from the overlay information file.

Figure 20:
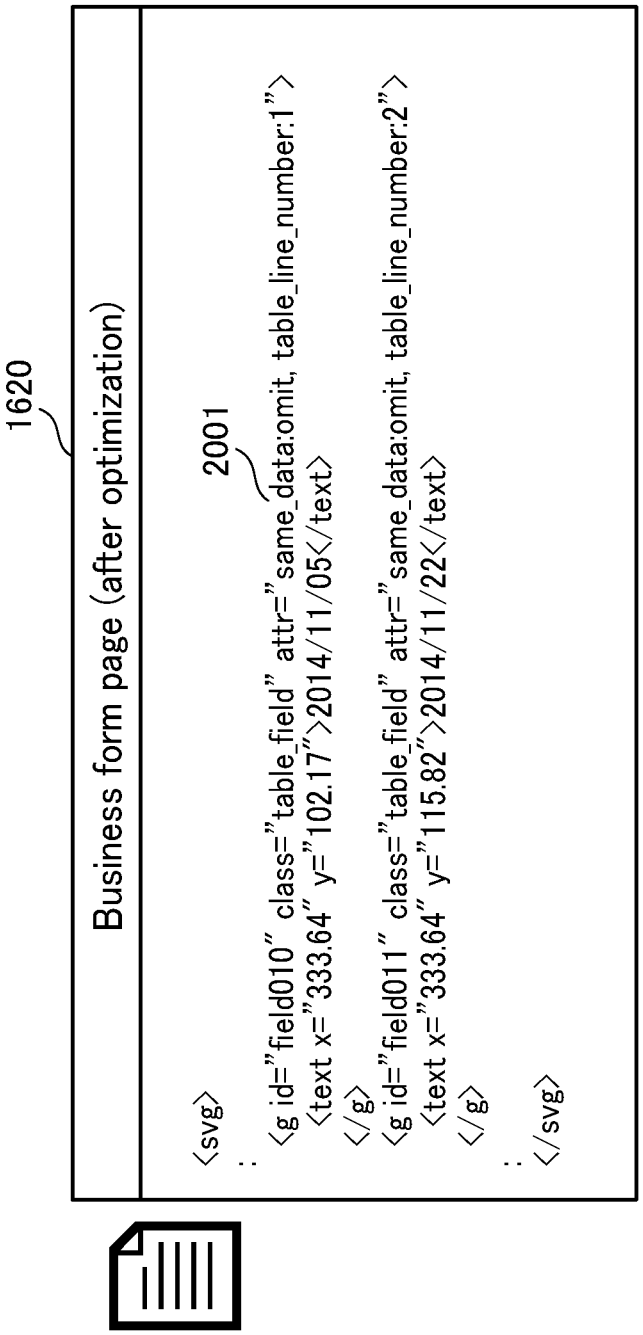
FIG. 20 is a diagram illustrating an example of a business form page on which optimization process is performed.

FIG. 20 is a diagram illustrating a business form page on which the optimization process is performed.

In a business form page 1620 on which the optimization process is performed, a value of an "attr" attribute 2001 is added as "same_data:omit" in step S1707 of the optimization process.

When the editing operation of the business form is performed by the user on the business form browsing screen, in step S1105 of the editing process (FIG. 11), the business form browsing program determines whether or not the re-creation (overlay again) of the business form page is necessary. More specifically, similar to the first embodiment, the business form browsing program confirms whether or not the value of the attr attribute of the editing target text element, which is specified in step S1102, is "same_data:omit". If the value of the attr attribute is "same_data:omit", the business form browsing program determines that creating the business form page again (performing the overlay output process again) is necessary.

In step S1108, the business form browsing program transmits the request for re-creating the business form browsing screen to the business form generating server 101. The business form generating unit 304 updates the field data of the corresponding business form, which is stored in the field data DB 307, based on the update information that is included in the received request. Subsequently, the creation of the business form page is performed again, but at this time, sorting data may be performed according to the setting of the field defined in the form information file 401. In the present embodiment, assume that ascending order is set to the "purchase date" field 1801. When performing the overlay output process again, the creation of the business form page is to be performed by sorting the data of the "purchase date" in ascending order after the field data is updated to "2014/11/25", which is the value newly inputted by the user.

FIG. 18B illustrates an example of the business form browsing screen, on which the overlay output process is performed again by the above setting, returned to the client apparatus 102.

Since the value (date) of the data of the field FIG. 1802 shown in FIG. 18A has been changed to a date after the value of the data of the field FIG. 1805, a line 1806 of the table is displayed on the end of the page by the sort process when the overlay output process is performed.

As described above, according to the present embodiment, if the business form page is edited, whether or not the overlay output process is performed again is appropriately determined, and the editing operation can be performed easily. If the editing of the business form page affects the layout, creating a business form page that has reflected the setting of the form information can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-040440, filed Mar. 2, 2015, which is hereby incorporated by reference wherein in its entirety.

What is claimed is:

1. An information processing system comprising:
a server; and
a client apparatus,
wherein the server comprises:
   a first memory; and
   a first processor in communication with the first memory, wherein the first processor functions as:
      a business form generating unit configured to generate a business form page based on PDL information obtained by overlaying form information and field data, wherein the overlaying obtains the PDL information by executing drawing instructions based on the form information and the field data;
      an attribute obtaining unit configured to obtain attribute information of the generated business form page when the overlaying is executed, wherein the attribute information includes layout information of fields included in the generated business form page; and
      a browsing data generating unit configured to generate, based on the generated business form page and the obtained attribute information, browsing data for displaying a browsing screen on which the generated business form page is browsed and edited, wherein the generated browsing data includes a control program for editing the generated business form page using the obtained attribute information, and
wherein the client apparatus comprises:
   a second memory; and
   a second processor in communication with the second memory, wherein the second processor executes the control program included in the generated browsing data to function as:
      in a case that a field of the business form page is edited on the browsing screen by a user, a determining unit configured to determine, by the client apparatus, based on the attribute information included in the browsing data and a value inputted in the field edited on the browsing screen, whether or not it is necessary that the business form generating unit of the server generates a recreated business form page by overlaying the form information and updated field data that is updated with the value inputted in the edited field;
      a transmitting unit configured to transmit a request to the server for requesting that the business form generating unit of the server generates the recreated business form page by overlaying the form information and the updated field data that is updated with the inputted value if the determining unit determines that it is necessary that the business form generating unit generates the recreated business form page by overlaying the form information and the updated field data; and
      a reflecting unit configured to reflect, without transmitting the request to the server, the inputted value to the field of the business form page on the browsing screen if the determining unit determines that it is not necessary that the business form generating unit generates the recreated business form page by overlaying the form information and the updated field data.

2. The information processing system according to claim 1, wherein the attribute information includes the layout information about whether or not displaying multiple lines in the edited field is allowed, and
   wherein if the edited field to which the value is inputted allows displaying multiple lines, the determining unit determines that it is necessary that the business form generating unit generates the recreated business form page by overlaying the form information and the updated field data.

3. The information processing system according to claim 2, wherein, at the time that a character string of the field is edited, even if the edited field allows displaying multiple lines, in a case in which a monospaced font is used and a value obtained by multiplying a character width of the monospaced font by a number of characters of the changed character string is smaller than a predetermined value, the determining unit determines that it is not necessary that the business form generating unit generates the recreated business form page by overlaying the form information and the updated field data.

4. The information processing system according to claim 2, wherein at the time when a character string of the field is edited, if the edited field does not allow to display multiple lines, the determining unit determines that it is not necessary that the business form generating unit generates the recreated business form page by overlaying the form information and the updated field data.

5. The information processing system according to claim 1, wherein the attribute information includes information about whether or not to omit displaying the field having same value, and
   wherein, in a case that at least one of the values of the fields having the same value is changed, the determining unit determines that it is necessary that the business form generating unit generates the recreated business form page by overlaying the form information and the updated field data.

6. The information processing system according to claim 1, wherein the business form generating unit generates the business form page in SVG format by converting a business form page in PDF format that is generated via a virtual printer based on the PDL information obtained by overlaying the form information and the field data.

7. A server comprising:
a memory; and
a processor executing a program stored in the memory to perform:
   generating a business form page based on PDL information obtained by overlaying form information and field data, wherein the overlaying obtains the PDL information by executing drawing instructions based on the form information and the field data;
   obtaining attribute information of the generated business form page when the overlaying is executed, wherein the attribute information includes layout information of fields included in the generated business form page;
   generating, based on the generated business form page and the obtained attribute information, browsing data for displaying a browsing screen on which the generated business form page is browsed and edited, wherein the generated browsing data includes a control program for editing the generated business form page using the obtained attribute information; and transmitting the browsing data to a client apparatus, wherein the client apparatus receives the browsing data from the server and executes the control program included in the browsing data to perform:

determining, by the client apparatus, based on the attribute information included in the browsing data and a value inputted in a field edited on the browsing screen in a case that the field of the business form page is edited by a user on the browsing screen that is displayed based on the browsing data, whether or not it is necessary that the server generates a recreated business form page by overlaying the form information and updated field data that is updated with the value inputted in the edited field;

transmitting a request to the server for requesting the server that the server generates the recreated business form page by overlaying the form information and the updated field data that is updated with the inputted value if it is determined to be necessary that the server generates the recreated business form page by overlaying the form information and the updated field data; and reflecting, without transmitting the request to the server, the inputted value to the field of the business form page on the browsing screen if it is determined not to be necessary that the server generates the recreated business form page by overlaying the form information and the updated field data.

8. A method for controlling an information processing system comprising:

generating, in a server, a business form page based on PDL information obtained by overlaying form information and field data, wherein the overlaying obtains the PDL information by executing drawing instructions based on the form information and the field data;

obtaining, in the server, attribute information of the generated business form page when the overlaying is executed, wherein the attribute information includes layout information of fields included in the generated business form page;

generating, in the server, browsing data based on the generated business form page and the obtained attribute information, the browsing data being data for displaying a browsing screen on which the generated business form page is browsed and edited, wherein the generated browsing data includes a control program for editing the generated business form page using the obtained attribute information;

determining, in a client apparatus that executes the control program included in the generated browsing data, based on the attribute information included in the browsing data and a value inputted in a field edited on the browsing screen in a case that the field of the business form page is edited on the browsing screen by a user, whether or not it is necessary that the server generates a recreated business form page by overlaying the form information and updated field data that is updated with the value inputted in the edited field;

transmitting, in the client apparatus, a request to the server for requesting that the server generates the recreated business form page by overlaying the form information and the updated field data that is updated with the inputted value if it is determined to be necessary that the server generates the recreated business form page by overlaying the form information and the updated field data; and reflecting, in the client apparatus, the inputted value to the field of the business form page on the browsing screen without transmitting the request to the server if it is determined not to be necessary that the server generates the recreated business form page by overlaying the form information and the updated field data.

9. A non-transitory storage medium on which is stored a computer program for making a server to perform:

generating a business form page based on PDL information obtained by overlaying form information and field data, wherein the overlaying obtains the PDL information by executing drawing instructions based on the form information and the field data;

obtaining attribute information of the generated business form page when the overlaying is executed, wherein the attribute information includes layout information of fields included in the generated business form page;

generating, based on the generated business form page and the obtained attribute information, browsing data for displaying a browsing screen on which the generated business form page is browsed and edited, wherein the generated browsing data includes a control program for editing the generated business form page using the obtained attribute information; and transmitting the browsing data to a client apparatus, wherein the client apparatus receives the browsing data from the server and executes the control program included in the browsing data to perform:

determining, by the client apparatus, based on the attribute information included in the browsing data and a value inputted in a field edited on the browsing screen in a case that the field of the business form page is edited by a user on the browsing screen that is displayed based on the browsing data, whether or not it is necessary that the server generates a recreated business form page by overlaying the form information and updated field data that is updated with the value inputted in the edited field;

transmitting a request to the server for requesting the server that the server generates the recreated business form page by overlaying the form information and the updated field data that is updated with the inputted value if it is determined to be necessary that the server generates the recreated business form page by overlaying the form information and the updated field data; and reflecting, without transmitting the request to the server, the inputted value to the field of the business form page on the browsing screen if it is determined not to be necessary that the server generates the recreated business form page by overlaying the form information and the updated field data.

* * * * *